United States Patent
Wang et al.

(10) Patent No.: US 6,904,402 B1
(45) Date of Patent: Jun. 7, 2005

(54) SYSTEM AND ITERATIVE METHOD FOR LEXICON, SEGMENTATION AND LANGUAGE MODEL JOINT OPTIMIZATION

(75) Inventors: Hai-Feng Wang, Hong Kong (CN); Chang-Ning Huang, Beijing (CN); Kai-Fu Lee, Woodinville, WA (US); Shuo Di, San Mateo, CA (US); Jianfeng Gao, Beijing (CN); Dong-Feng Cai, Liaoning Province (CN); Lee-Feng Chien, Beijing (CN)

(73) Assignee: Microsoft Corporation, Redmond, WA (US)

( * ) Notice: Subject to any disclaimer, the term of this patent is extended or adjusted under 35 U.S.C. 154(b) by 783 days.

(21) Appl. No.: 09/609,202

(22) Filed: Jun. 30, 2000

Related U.S. Application Data
(60) Provisional application No. 60/163,850, filed on Nov. 5, 1999.

(51) Int. Cl.[7] .......................... G06F 17/21; G06F 17/20; G10L 15/00
(52) U.S. Cl. .............................. 704/10; 704/1; 704/255
(58) Field of Search ........................... 704/9, 257, 235, 704/1, 10, 255; 707/5

(56) References Cited

U.S. PATENT DOCUMENTS
5,621,859 A * 4/1997 Schwartz et al. ........... 704/256
5,806,021 A * 9/1998 Chen et al. .................... 704/9

FOREIGN PATENT DOCUMENTS
WO   WO 99/00789   1/1999

OTHER PUBLICATIONS
"Statistics–Based Segment Pattern Lexicon—A New Direction for Chinese Language Modeling", Yang, Ho, Chien and Lee, pp. 169–172, 1998 IDDD.

* cited by examiner

Primary Examiner—Patrick N. Edouard
(74) Attorney, Agent, or Firm—Microsoft Corp (57) ABSTRACT

A method for optimizing a language model is presented comprising developing an initial language model from a lexicon and segmentation derived from a received corpus using a maximum match technique, and iteratively refining the initial language model by dynamically updating the lexicon and re-segmenting the corpus according to statistical principles until a threshold of predictive capability is achieved.

13 Claims, 5 Drawing Sheets

SYSTEM AND ITERATIVE METHOD FOR LEXICON, SEGMENTATION AND LANGUAGE MODEL JOINT OPTIMIZATION

This application claims priority to a provisional patent application No. 60/163,850, entitled "An iterative method for lexicon, word segmentation and language model joint optimization", filed on Nov. 5, 1999 by the inventors of this application.

TECHNICAL FIELD

This invention generally relates to language modeling and, more specifically, to a system and iterative method for lexicon, word segmentation and language model joint optimization.

BACKGROUND

Recent advances in computing power and related technology have fostered the development of a new generation of powerful software applications including web-browsers, word processing and speech recognition applications. The latest generation of web-browsers, for example, anticipate a uniform resource locator (URL) address entry after a few of the initial characters of the domain name have been entered. Word processors offer improved spelling and grammer checking capabilities, word prediction, and language conversion. Newer speech recognition applications similarly offer a wide variety of features with impressive recognition and prediction accuracy rates. In order to be useful to an end-user, these features must execute in substantially real-time. To provide this performance, many applications rely on a tree-like data structure to build a simple language model.

Simplistically, a language model measures the likelihood of any given sentence. That is, a language model can take any sequence of items (words, characters, letters, etc.) and estimate the probability of the sequence. A common approach to building a prior art language model is to utilize a prefix tree-like data structure to build an N-gram language model from a known training set of a textual corpus.

The use of a prefix tree data structure (a.k.a. a suffix tree, or a PAT tree) enables a higher-level application to quickly traverse the language model, providing the substantially real-time performance characteristics described above. Simplistically, the N-gram language model counts the number of occurrences of a particular item (word, character, etc.) in a string (of size N) throughout a text. The counts are used to calculate the probability of the use of the item strings. Traditionally, a tri-gram (N-gram where N=3) approach involves the following steps:

(a) a textual corpus is dissected into a plurality of items (characters, letters, numbers, etc.);

(b) the items (e.g., characters (C)) are segmented (e.g., into words (W)) in accordance with a small, pre-defined lexicon and a simple, pre-defined segmentation algorithm, wherein each W is mapped in the tree to one or more C's;

(c) train a language model on the dissected corpus by counting the occurrence of strings of characters, from which the probability of a sequence of words ($W_1, W_2, \ldots W_M$) is predicted from the previous two words:

$$P(W_1, W_2, W_3, \ldots W_M) \approx \Pi P(W_i | W_{i-1}, W_{i-2}) \qquad (1)$$

The N-gram language model is limited in a number of respects. First, the counting process utilized in constructing the prefix tree is very time consuming. Thus, only small N-gram models (typically bi-gram, or tri-gram) can practically be achieved. Second, as the string size (N) of the N-gram language model increases, the memory required to store the prefix tree increases by $2^N$. Thus, the memory required to store the N-gram language model, and the access time required to utilize a large N-gram language model is prohibitively large for N-grams larger than three (i.e., a tri-gram).

Prior art N-gram language models tend to use a fixed (small) lexicon, a simplistic segmentation algorithm, and will typically only rely on the previous two words to predict the current word (in a tri-gram model).

A fixed lexicon limits the ability of the model to select the best words in general or specific to a task. If a word is not in the lexicon, it does not exist as far as the model is concerned. Thus, a small lexicon is not likely to cover the intended linguistic context.

The segmentation algorithms are often ad-hoc and not based on any statistical or semantic principles. A simplistic segmentation algorithm typically errors in favor of larger words over smaller words. Thus, the model is unable to accurately predict smaller words contained within larger lexiconally acceptable strings.

As a result of the foregoing limitations, a language model using prior art lexicon and segmentation algorithms tend to be error prone. That is, any errors made in the lexicon or segmentation stage are propagated throughout the language model, thereby limiting its accuracy and predictive attributes.

Finally, limiting the model to at most the previous two words for context (in a tri-gram language model) is also limiting in that a greater context might be required to accurately predict the likelihood of a word. The limitations on these three aspects of the language model often result in poor predictive qualities of the language model.

Thus, a system and method for lexicon, segmentation algorithm and language model joint optimization is required, unencumbered by the deficiencies and limitations commonly associated with prior art language modeling techniques. Just such a solution is provided below.

SUMMARY

This invention concerns a system and iterative method for lexicon, segmentation and language model joint optimization. To overcome the limitations commonly associated with the prior art, the present invention does not rely on a predefined lexicon or segmentation algorithm, rather the lexicon and segmentation algorithm are dynamically generated in an iterative process of optimizing the language model. According to one implementation, a method for improving language model performance is presented comprising developing an initial language model from a lexicon and segmentation derived from a received corpus using a maximum match technique, and iteratively refining the initial language model by dynamically updating the lexicon and re-segmenting the corpus according to statistical principles until a threshold of predictive capability is achieved.

BRIEF DESCRIPTION OF THE DRAWINGS

The same reference numbers are used throughout the figures to reference like components and features.

DETAILED DESCRIPTION

This invention concerns a system and iterative method for lexicon, segmentation and language model joint optimization. In describing the present invention, an innovative language model, the Dynamic Order Markov Model (DOMM), is referenced. A detailed description of DOMM is presented in copending U.S. patent application No. 09/608, 526 entitled *A Method and Apparatus for Generating and Managing a Language Model Data Structure,* by Lee, et al., the disclosure of which is expressly incorporated herein by reference.

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, microcomputers, mainframe computers, and the like. In a distributed computer environment, program modules may be located in both local and remote memory storage devices. It is noted, however, that modification to the architecture and methods described herein may well be made without deviating from spirit and scope of the present invention.

Example Computer System

Figure 1:
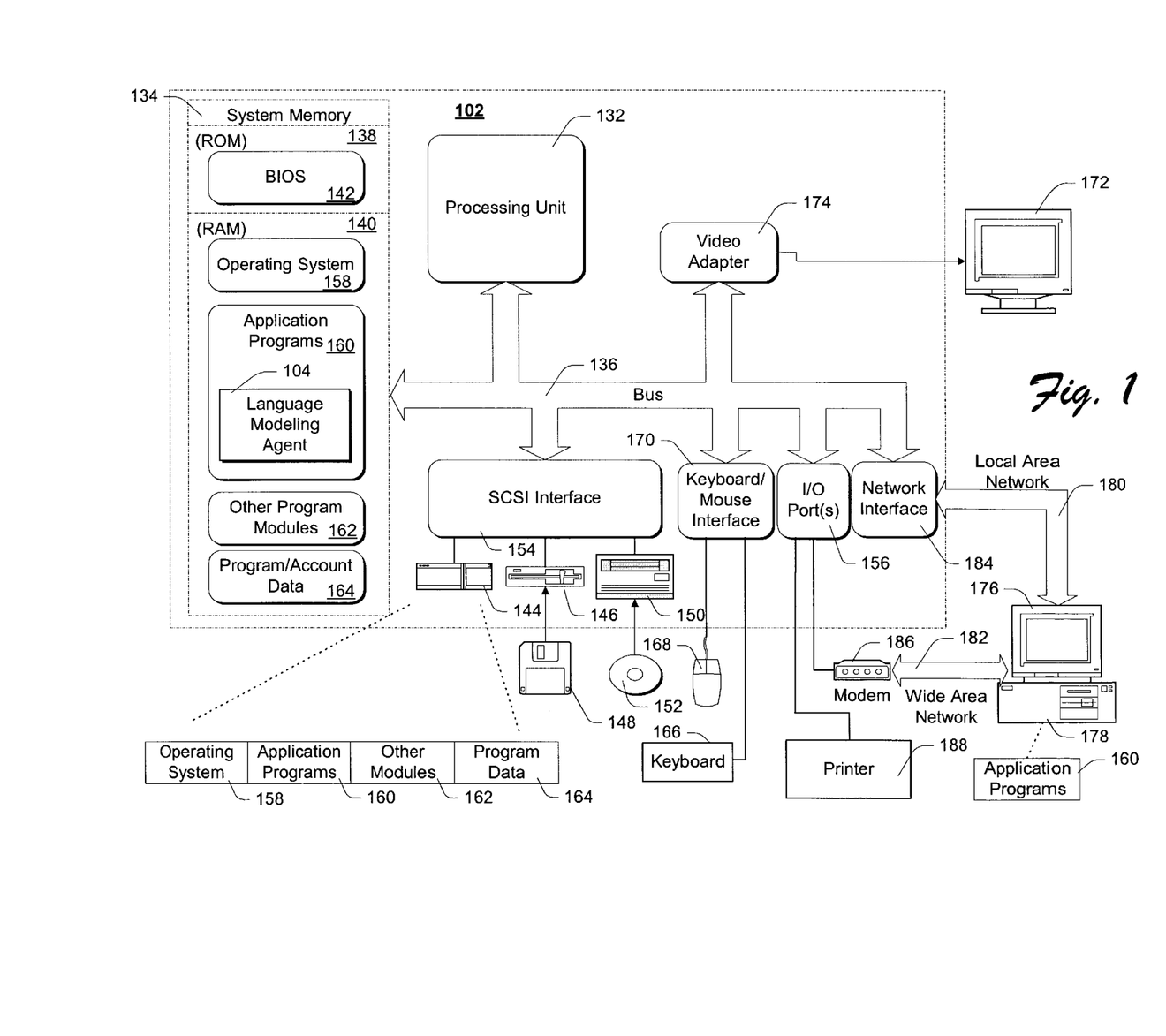
FIG. 1 is a block diagram of a computer system incorporating the teachings of the present invention.

FIG. 1 illustrates an example computer system 102 including an innovative language modeling agent 104, to jointly optimize a lexicon, segmentation and language model according to the teachings of the present invention. It should be appreciated that although depicted as a separate, stand alone application in FIG. 1, language modeling agent 104 may well be implemented as a function of an application, e.g., word processor, web browser, speech recognition system, etc. Moreover, although depicted as a software application, those skilled in the art will appreciate that the innovative modeling agent may well be implemented in hardware, e.g., a programmable logic array (PLA), a special purpose processor, an application specific integrated circuit (ASIC), microcontroller, and the like.

It will be evident, from the discussion to follow, that computer 102 is intended to represent any of a class of general or special purpose computing platforms which, when endowed with the innovative language modeling agent (LMA) 104, implement the teachings of the present invention in accordance with the first example implementation introduced above. It is to be appreciated that although the language modeling agent is depicted herein as a software application, computer system 102 may alternatively support a hardware implementation of LMA 104 as well. In this regard, but for the description of LMA 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative LMA 104 incorporating the teachings of the present invention, other program modules 162, and program data 164 (e.g., resultant language model data structures, etc.). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a network environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a input/output (I/O) interface 136. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Language Modeling Agent

Figure 2:
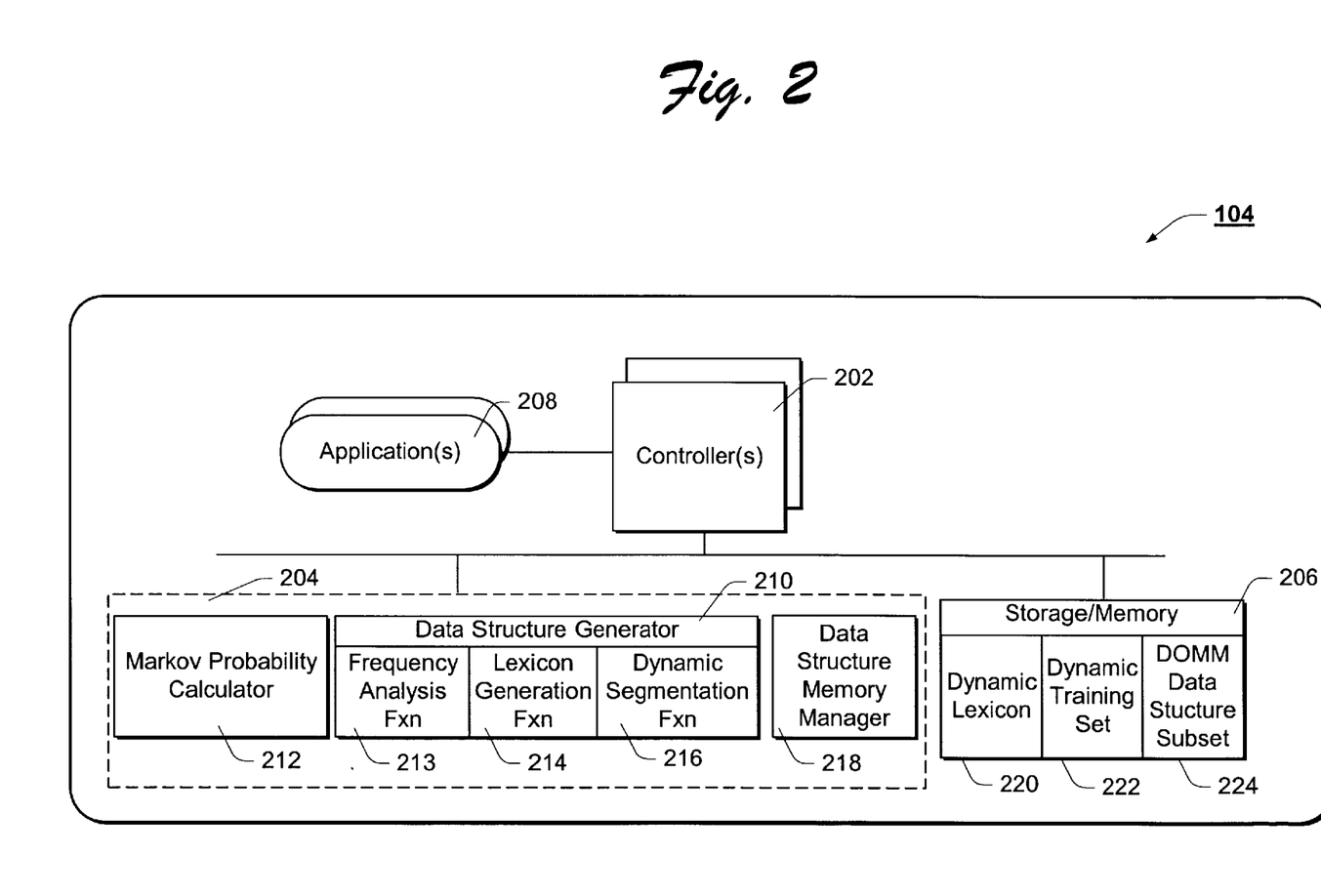
FIG. 2 is a block diagram of an example modeling agent to iteratively develop a lexicon, segmentation and language model, according to one implementation of the present invention.

FIG. 2 illustrates a block diagram of an example language modeling agent (LMA) 104, incorporating the teachings of the present invention. As shown, language modeling agent 104 is comprised of one or more controllers 202, innovative analysis engine 204, storage/memory device(s) 206 and, optionally, one or more additional applications (e.g., graphical user interface, prediction application, verification application, estimation application, etc.) 208, each communicatively coupled as shown. It will be appreciated that although depicted in FIG. 2 as a number of disparate blocks, one or more of the functional elements of the LMA 104 may well be combined. In this regard, modeling agents of greater or lesser complexity which iteratively jointly optimize a dynamic lexicon, segmentation and language model may well be employed without deviating from the spirit and scope of the present invention.

As alluded to above, although depicted as a separate functional element, LMA 104 may well be implemented as a function of a higher level application, e.g., a word processor, web browser, speech recognition system, or a language conversion system. In this regard, controller(s) 202 of LMA 104 are responsive to one or more instructional commands from a parent application to selectively invoke the features of LMA 104. Alternatively, LMA 104 may well be implemented as a stand-alone language modeling tool, providing a user with a user interface (208) to selectively implement the features of LMA 104 discussed below.

In either case, controller(s) 202 of LMA 104 selectively invoke one or more of the functions of analysis engine 204 to optimize a language model from a dynamically generated lexicon and segmentation algorithm. Thus, except as configured to effect the teachings of the present invention, controller 202 is intended to represent any of a number of alternate control systems known in the art including, but not limited to, a microprocessor, a programmable logic array (PLA), a micro-machine, an application specific integrated circuit (ASIC) and the like. In an alternate implementation, controller 202 is intended to represent a series of executable instructions to implement the control logic described above.

As shown, the innovative analysis engine 204 is comprised a Markov probability calculator 212, a data structure generator 210 including a frequency calculation function 213, a dynamic lexicon generation function 214 and a dynamic segmentation function 216, and a data structure memory manager 218. Upon receiving an external indication, controller 202 selectively invokes an instance of the analysis engine 204 to develop, modify and optimize a statistical language model (SLM). More specifically, in contrast to prior art language modeling techniques, analysis engine 204 develops a statistical language model data structure fundamentally based on the Markov transition probabilities between individual items (e.g., characters, letters, numbers, etc.) of a textual corpus (e.g., one or more sets of text). Moreover, as will be shown, analysis engine 204 utilizes as much data (referred to as "context" or "order" as is available to calculate the probability of an item string. In this regard, the language model of the present invention is aptly referred to as a Dynamic Order Markov Model (DOMM).

When invoked by controller 202 to establish a DOMM data structure, analysis engine 204 selectively invokes the data structure generator 210. In response, data structure generator 210 establishes a tree-like data structure comprised of a plurality of nodes (associated with each of the plurality of items) and denoting inter-node dependencies. As described above, the tree-like data structure is referred to herein as a DOMM data structure, or DOMM tree. Controller 202 receives the textual corpus and stores at least a subset of the textual corpus in memory 206 as a dynamic training set 222 from which the language model is to be developed. It will be appreciated that, in alternate embodiments, a predetermined training set may also be used.

Once the dynamic training set is received, at least a subset of the training set 222 is retrieved by frequency calculation function 213 for analysis. Frequency calculation function 213 identifies a frequency of occurrence for each item (character, letter, number, word, etc.) in the training set subset. Based on internode dependencies, data structure generator 210 assigns each item to an appropriate node of the DOMM tree, with an indication of the frequency value ($C_i$) and a compare bit ($b_i$).

The Markov probability calculator 212 calculates the probability of an item (character, letter, number, etc.) from a context (j) of associated items. More specifically, according to the teachings of the present invention, the Markov probability of a particular item ($C_i$) is dependent on as many previous characters as data "allows", in other words:

$$P(C_1, C_2, C_3, \ldots, C_N) \approx \Pi P(C_{i-1}, C_{i-2}, C_{i-3}, \ldots, C_j) \qquad (2)$$

The number of characters employed as context (j) by Markov probability calculator 212 is a "dynamic" quantity that is different for each sequence of characters $C_i$, $C_{i-1}$, $C_{i-2}$, $C_{i-3}$, etc. According to one implementation, the number of characters relied upon for context (j) by Markov probability calculator 212 is dependent, at least in part, on a frequency value for each of the characters, i.e., the rate at which they appear throughout the corpus. More specifically, if in identifying the items of the corpus Markov probability calculator 212 does not identify at least a minimum occurrence frequency for a particular item, it may be "pruned" (i.e., removed) from the tree as being statistically irrelevant. According to one embodiment, the minimum frequency threshold is three (3).

As alluded to above, analysis engine 204 does not rely on a fixed lexicon or a simple segmentation algorithm (both of which tend to be error prone). Rather, analysis engine 204 selectively invokes a dynamic segmentation function 216 to segment items (characters or letters, for example) into strings (e.g., words). More precisely, segmentation function 216 segments the training set 222 into subsets (chunks) and calculates a cohesion score (i.e., a measure of the similarity between items within the subset). The segmentation and cohesion calculation is iteratively performed by segmentation function 216 until the cohesion score for each subset reaches a predetermined threshold.

The lexicon generation function 214 is invoked to dynamically generate and maintain a lexicon 220 in memory 206. According to one implementation, lexicon generation function 214 analyzes the segmentation results and generates a lexicon from item strings with a Markov transition probability that exceeds a threshold. In this regard, lexicon generation function 214 develops a dynamic lexicon 220 from item strings which exceed a pre-determined Markov transition probability taken from one or more language models developed by analysis engine 204. Accordingly, unlike prior art language models which rely on a known, fixed lexicon that is prone to error, analysis engine 204 dynamically generates a lexicon of statistically significant, statistically accurate item strings from one or more language models developed over a period of time. According to one embodiment, the lexicon 220 comprises a "virtual corpus" that Markov probability calculator 212 relies upon (in addition to the dynamic training set) in developing subsequent language models.

When invoked to modify or utilize the DOMM language model data structure, analysis engine 204 selectively invokes an instance of data structure memory manager 218. According to one aspect of the invention, data structure memory manager 218 utilizes system memory as well as extended memory to maintain the DOMM data structure. More specifically, as will be described in greater detail below with reference to FIGS. 6 and 7, data structure memory manager 218 employs a WriteNode function and a ReadNode function (not shown) to maintain a subset of the most recently used nodes of the DOMM data structure in a first level cache 224 of a system memory 206, while relegating least recently used nodes to extended memory (e.g., disk files in hard drive 144, or some remote drive), to provide for improved performance characteristics. In addition, a second level cache of system memory 206 is used to aggregate write commands until a predetermined threshold has been met, at which point data structure memory manager make one aggregate WriteNode command to an appropriate location in memory. Although depicted as a separate functional element, those skilled in the art will appreciate that data structure memory manager 218 may well be combined as a functional element of controller(s) 202 without deviating from the spirit and scope of the present invention.

Example Data Structure—Dynamic Order Markov Model (DOMM) Tree

Figure 3:
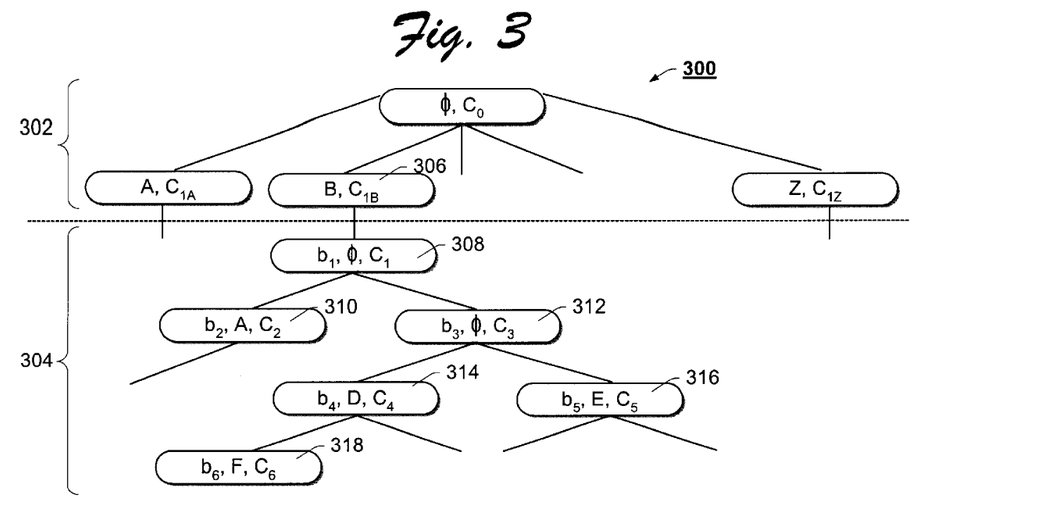
FIG. 3 is a graphical representation of a DOMM tree according to one aspect of the present invention.

FIG. 3 graphically represents a conceptual illustration of an example Dynamic Order Markov Model tree-like data structure 300, according to the teachings of the present invention. To conceptually illustrate how a DOMM tree data structure 300 is configured, FIG. 3 presents an example DOMM data structure 300 for a language model developed from the English alphabet, i.e., A, B, C, . . . Z. As shown the DOMM tree 300 is comprised of one or more root nodes 302 and one or more subordinate nodes 304, each associated with an item (character, letter, number, word, etc.) of a textual corpus, logically coupled to denote dependencies between nodes. According to one implementation of the present invention, root nodes 302 are comprised of an item and a frequency value (e.g., a count of how many times the item occurs in the corpus). At some level below the root node level 302, the subordinate nodes are arranged in binary sub-trees, wherein each node includes a compare bit ($b_i$), an item with which the node is associated (A, B, . . . ), and a frequency value ($C_N$) for the item.

Thus, beginning with the root node associated with the item B 306, a binary sub-tree is comprised of subordinate nodes 308–318 denoting the relationships between nodes and the frequency with which they occur. Given this conceptual example, it should be appreciated that starting at a root node, e.g., 306, the complexity of a search of the DOMM tree approximates log(N), where N is the total number of nodes to be searched.

As alluded to above, the size of the DOMM tree 300 may exceed the space available in the memory device 206 of LMA 104 and/or the main memory 140 of computer system 102. Accordingly, data structure memory manager 218 facilitates storage of a DOMM tree data structure 300 across main memory (e.g., 140 and/or 206) into an extended memory space, e.g., disk files on a mass storage device such as hard drive 144 of computer system 102.

Example Operation and Implementation

Having introduced the functional and conceptual elements of the present invention with reference to FIGS. 1–3, the operation of the innovative language modeling agent 104 will now be described with reference to FIGS. 5–10.

Building DOMM Tree Data Structure

Figure 4:
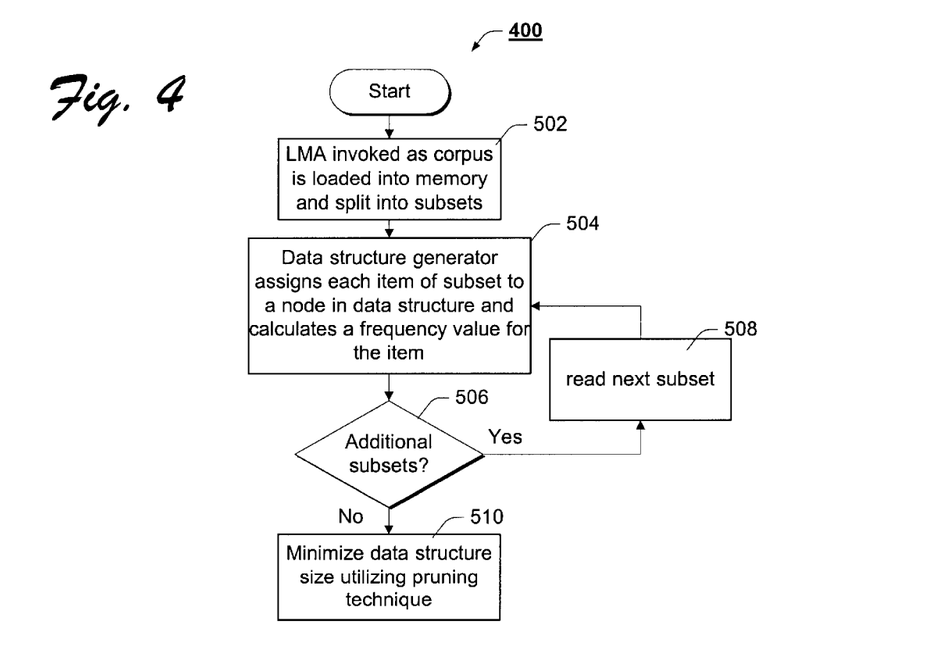
FIG. 4 is a flow chart of an example method for building a DOMM tree.

FIG. 4 is a flow chart of an example method for building a Dynamic Order Markov Model (DOMM) data structure, according to one aspect of the present invention. As alluded to above, language modeling agent 104 may be invoked directly by a user or a higher-level application. In response, controller 202 of LMA 104 selectively invokes an instance of analysis engine 204, and a textual corpus (e.g., one or more documents) is loaded into memory 206 as a dynamic training set 222 and split into subsets (e.g., sentences, lines, etc.), block 402. In response, data structure generator 210 assigns each item of the subset to a node in data structure and calculates a frequency value for the item, block 404. According to one implementation, once data structure generator has populated the data structure with the subset, frequency calculation function 213 is invoked to identify the occurrence frequency of each item within the training set subset.

In block 406, data structure generator determines whether additional subsets of the training set remain and, if so, the next subset is read in block 408 and the process continues with block 404. In alternate implementation, data structure generator 210 completely populates the data structure, a subset at a time, before invocation of the frequency calculation function 213. In alternate embodiment, frequency calculation function 213 simply counts each item as it is placed into associated nodes of the data structure.

If, in block 406 data structure generator 210 has completely loaded the data structure 300 with items of the training set 222, data structure generator 210 may optionally prune the data structure, block 410. A number of mechanisms may be employed to prune the resultant data structure 300.

Figure 5:
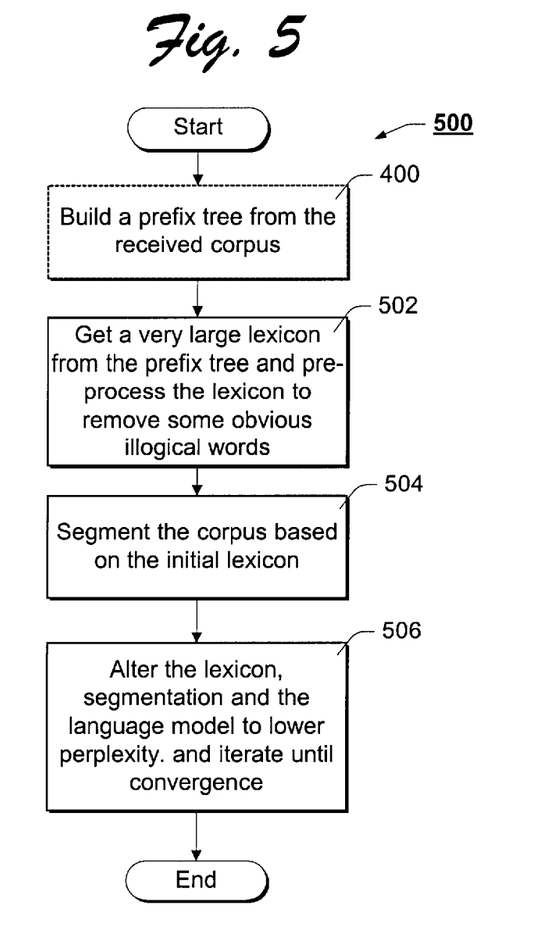
FIG. 5 is a flow chart of an example method for lexicon, segmentation and language model joint optimization, according to the teachings of the present invention.

Example Method for Lexicon, Segmentation and Language Model Joint Optimization FIG. 5 is a flow chart of an example method for lexicon, segmentation and language model joint optimization, according to the teachings of the present invention. As shown, the method begins with block 400 wherein LM 104 is invoked and a prefix tree of at least a subset of the received corpus is built. More specifically, as detailed in FIG. 4, data structure generator 210 of modeling agent 104 analyzes the received corpus and selects at least a subset as a training set, from which a DOMM tree is built.

In block 502, a very large lexicon is built form the prefix tree and pre-processed to remove some obvious illogical words. More specifically, lexicon generation function 214 is invoked to build an initial lexicon from the prefix tree. According to one implementation, the initial lexicon is built from the prefix tree using all sub-strings whose length is less than some pre-defined value, say ten (10) items (i.e., the sub-string is ten nodes or less from root to the most subordinate node). Once the initial lexicon is compiled, lexicon generation function 214 prunes the lexicon by removing some obvious illogical words (see, e.g., block 604, below). According to one implementation, lexicon generation function 214 appends a pre-defined lexicon with the new, initial lexicon generated from at least the training set of the received corpus.

In block 504, at least the training set of the received corpus is segmented, using the initial lexicon. More particularly, dynamic segmentation function 216 is invoked to segment at least the training set of the received corpus to generate an initial segmented corpus. Those skilled in the art will appreciate that there are a number of ways in which the training corpus could be segmented, e.g., fixed-length segmentation, Maximum Match, etc. To do so without having yet generated a statistical language model (SLM) from the received corpus, dynamic segmentation function 216 utilizes a Maximum Match technique to provide an initial segmented corpus. Accordingly, segmentation function 216 starts at the beginning of an item string (or branch of the DOMM tree) and searches lexicon to see if the initial item ($I_1$) is a one-item "word". Segmentation function then combines it with the next item in the string to see if the combination (e.g., $I_1I_2$) is found as a "word" in the lexicon, and so on. According to one implementation, the longest string ($I_1, I_2, \ldots I_N$) of items found in the lexicon is deemed to be the correct segmentation for that string. It is to be appreciated that more complex Maximum Match algorithms may well be utilized by segmentation function 216 without deviating from the scope and spirit of the present invention.

Having developed an initial lexicon and segmentation from the training corpus, an iterative process is entered wherein the lexicon, segmentation and language model are jointly optimized, block 506. More specifically, as will be shown in greater detail below, the innovative iterative optimization employs a statistical language modeling approach to dynamically adjust the segmentation and lexicon to provide an optimized language model. That is, unlike prior art language modeling techniques, modeling agent 104 does not rely on a pre-defined static lexicon, or simplistic segmentation algorithm to generate a language model. Rather, modeling agent 104 utilizes the received corpus, or at least a subset thereof (training set), to dynamically generate a lexicon and segmentation to produce an optimized language model. In this regard, language models generated by modeling agent 104 do not suffer from the drawbacks and limitations commonly associated with prior art modeling systems.

Figure 6:
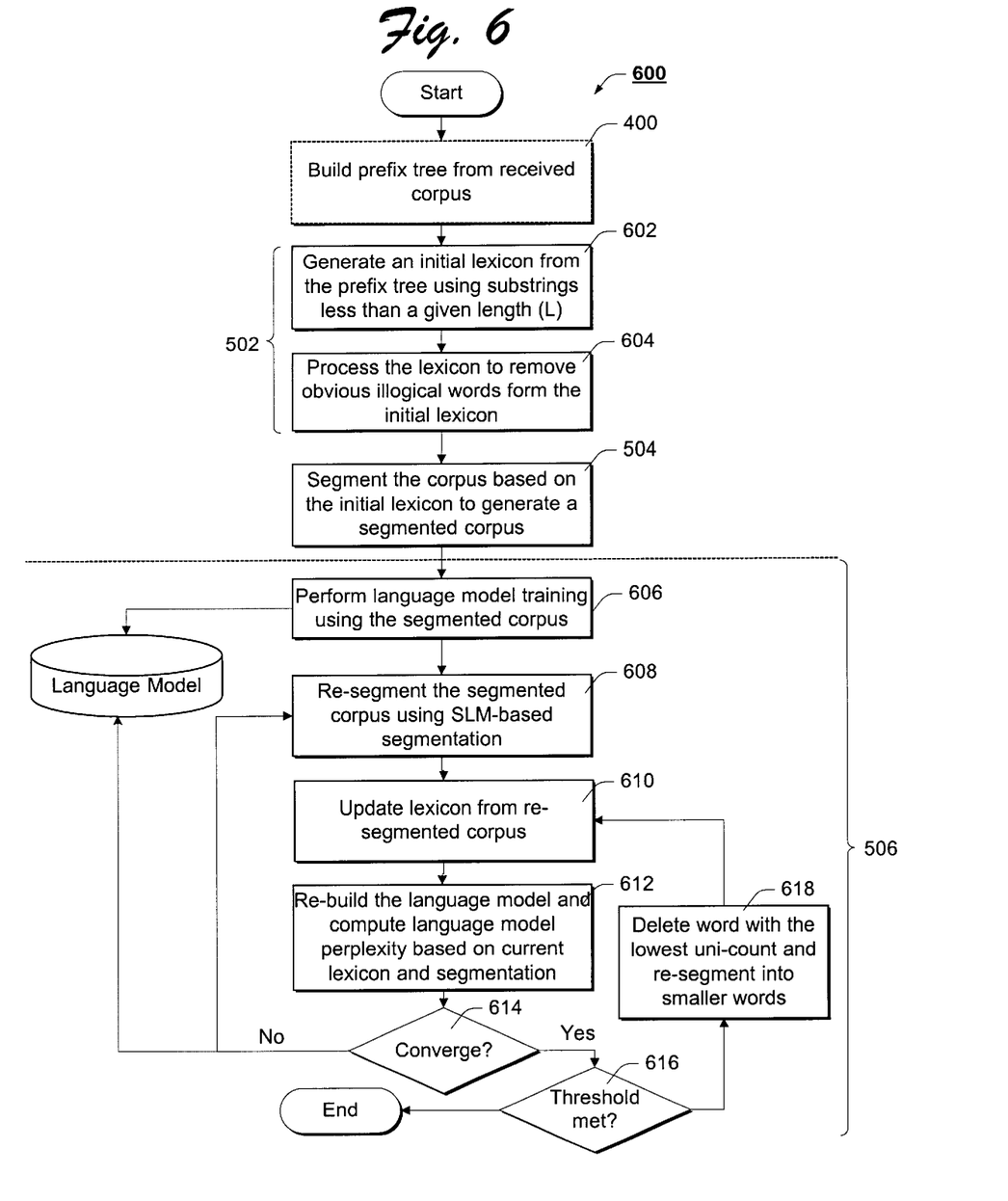
FIG. 6 is a flow chart detailing the method steps for generating an initial lexicon, and iteratively altering a dynamically generated lexicon, segmentation and language model until convergence, according to one implementation of the present invention.

Having introduced the innovative process in FIG. 5, FIG. 6 presents a more detailed flow chart for generating an initial lexicon, and the iterative process of refining the lexicon and segmentation to optimize the language model, according to one implementation of the present invention. As before, the method begins with step 400 (FIG. 4) of building a prefix tree from the received corpus. As discussed above, the prefix tree may be built using the entire corpus or, alternatively, using a subset entire corpus (referred to as a training corpus).

In block 502, the process of generating an initial lexicon begins with block 602, wherein lexicon generation function 214 generates an initial lexicon from the prefix tree by identifying substrings (or branches of the prefix tree) with less than a select number of items. According to one implementation, lexicon generation function 214 identifies substrings of ten (10) items or less to comprise the initial lexicon. In block 604, lexicon generation function 214 analyzes the initial lexicon generated in step 602 for obvious illogical substrings, removing these substrings from the initial lexicon. That is, lexicon generation function 214 analyzes the initial lexicon of substrings for illogical, or improbable words and removes these words from the lexicon. For the initial pruning, dynamic segmentation function 216 is invoked to segment at least the training set of the received corpus to generate an segmented corpus. According to one implementation, the Maximum Match algorithm is used to segment based on the initial lexicon. Then the frequency analysis function 213 is invoked to compute the frequency of the occurrence in the received corpus for each word in the lexicon, sorting the lexicon according to the frequency of occurrence. The word with the lowest frequency is identified and deleted from the lexicon. The threshold for this deletion and re-segmentation may be determined according to the size of the corpus. According to one implementation, a corpus of 600M items may well utilize a frequency threshold of 500 to be included within the lexicon. In this way, we can delete most of the obvious illogical words from the initial lexicon.

Once the initial lexicon is generated and pruned, step 502, the received corpus is segmented based, at least in part, on the initial lexicon, block 504. As described above, according to one implementation, the initial segmentation of the corpus is performed using a maximum matching process.

Once the initial lexicon and corpus segmentation process is complete, an iterative process of dynamically altering the lexicon and segmentation begins to optimize a statistical language model (SLM) from the received corpus (or training set), block 506. As shown, the process begins in block 606, wherein the Markov probability calculator 212 utilizes the initial lexicon and segmentation to begin language model training using the segmented corpus. That is, given the initial lexicon and an initial segmentation, a statistical language model may be generated therefrom. It should be noted that although the language model does not yet benefit from a refined lexicon and a statistically based segmentation (which will evolve in the steps to follow), it is nonetheless fundamentally based on the received corpus itself.

In block 608, having performed initial language model training, the segmented corpus (or training set) is re-segmented using SLM-based segmentation. Given a sentence w1, w2, . . . wn, there are M possible ways to segment it (where M≧1). Dynamic segmentation function 216 computes a probability ($p_i$) of each segmented ($S_i$) based on an N-gram statistical language model. According to one implementation, segmentation function 216 utilizes a trigram (i.e., N=3) statistical language model for determining the probability of any given segmentation. A Viterbi search algorithm is employed to find the most probable segmentation $S_k$, where:

$$S_k = argmax(p_i) \quad (3)$$

In block 610, the lexicon is updated using the re-segmented corpus resulting from the SLM-based segmentation described above. According to one implementation, modeling agent 104 invokes frequency analysis function 213 to computer the frequency of occurrence in the received corpus for each word in the lexicon, sorting the lexicon according to the frequency of occurrence. The word with the lowest frequency is identified and deleted from the lexicon. All occurrences of the word must then be re-segmented into smaller words, as the uni-count for all those words are re-computed. The threshold for this deletion and re-segmentation may be determined according to the size of the corpus. According to one implementation, a corpus of 600M items may well utilize a frequency threshold of 500 to be included within the lexicon.

In block 612, the language model is updated to reflect the dynamically generated lexicon and the SLM-based segmentation, and a measure of the language model perplexity (i.e., an inverse probability measure) is computer by Markov probability calculator 212. If the perplexity continues to converge (toward zero (0)), i.e., improve, the process continues with block 608 wherein the lexicon and segmentation are once again modified with the intent of further improving the language model performance (as measured by perplexity). If in block 614 it is determined that the language model has not improved as a result of the recent modifications to the lexicon and segmentation, a further determination of whether the perplexity has reached an acceptable threshold is made, block 616. If so, the process ends.

If, however, the language model has not yet reached an acceptable perplexity threshold, lexicon generation function 214 deletes the word with the smallest frequency of occurrence in the corpus from the lexicon, re-segmenting the word into smaller words, block 618, as the process continues with block 610.

It is to be appreciated, based on the foregoing, that innovative language modeling agent 104 generates an optimized language model premised on a dynamically generated lexicon and segmentation rules statistically predicated on at least a subset of the received corpus. In this regard, the resultant language model has improved computational and predictive capability when compared to prior art language models.

Alternate Embodiments

Figure 7:
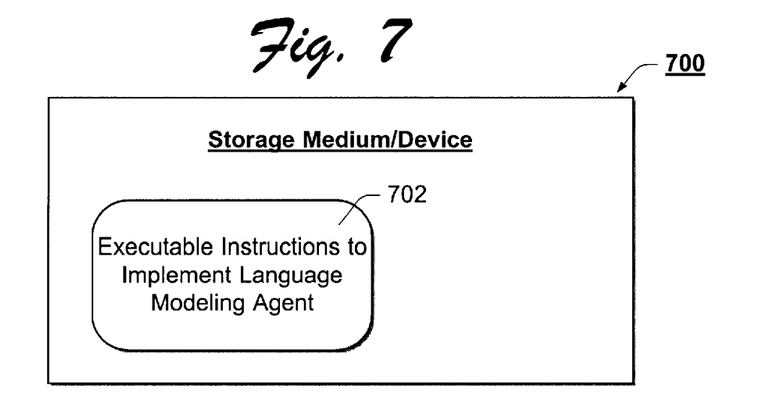
FIG. 7 is a storage medium with a plurality of executable instructions which, when executed, implement the innovative modeling agent of the present invention, according to an alternate embodiment of the present invention.

FIG. 7 is a block diagram of a storage medium having stored thereon a plurality of instructions including instructions to implement the innovative modeling agent of the present invention, according to yet another embodiment of the present invention. In general, FIG. 7 illustrates a storage medium/device 700 having stored thereon a plurality of executable instructions 702 including at least a subset of which that, when executed, implement the innovative modeling agent 104 of the present invention. When executed by a processor of a host system, the executable instructions 702 implement the modeling agent to generate a statistical language model representation of a textual corpus for use by any of a host of other applications executing on or otherwise available to the host system.

As used herein, storage medium 700 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 700 need not be co-located with any host system. That is, storage medium/device 700 may well reside within a remote server communicatively coupled to and accessible by an executing system. Accordingly, the software implementation of FIG. 7 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A method comprising:
   developing an initial language model from a lexicon and segmentation derived from a received corpus; and
   iteratively refining the initial language model by dynamically updating the lexicon and re-segmenting the corpus according to statistical principles until a threshold of predictive capability is achieved; wherein:
   iteratively refining the language model comprises:
      re-segmenting the corpus by determining, for each segment, a probability of occurrence for that segment; and
      updating the lexicon from the re-segmented corpus;
   updating the lexicon comprises:
      identifying a frequency of occurrence for each word of a lexicon in the received corpus; and
      deleting the word with the smallest identified frequency from the lexicon; and the method further comprises re-segmenting the deleted word into two or more smaller words and updating the lexicon with the re-segmented words.

2. A method according to claim 1, wherein developing an initial language model comprises:

generating a prefix tree data structure from items dissected from the received corpus;

identifying sub-strings of N items or less from the prefix tree data structure; and populating the lexicon with the identified sub-strings.

3. A method according to claim 2, wherein N is equal to three (3).

4. A method according to claim 1, wherein determining the probability of occurrence for a segment is calculated using an N-gram language model.

5. A method according to claim 4, wherein the N-gram language model is a tri-gram language model.

6. A method according to claim 1, wherein determining the probability of occurrence for a segment is calculated using two prior segments.

7. A method according to claim 1, further comprising:

determining whether the predictive capability of the language model improved as a result of the steps of updating and re-segmenting; and performing additional updating and re-segmenting if the predictive capability improved until no further improvement is identified.

8. A method according to claim 1, wherein predictive capability is quantitatively expressed as a perplexity measure.

9. A method according to claim 8, wherein the language model is refined until the perplexity measure is reduced below an acceptable predictive threshold.

10. A method according to claim 1, further comprising utilizing the iteratively refined language model in an application to predict a likelihood of another corpus, wherein the application is one or more of a spelling and/or grammatical checker, a word-processing application, a language translation application, a speech recognition application, and the like.

11. A storage medium comprising a plurality of executable instructions including at least a subset of which, when executed, implement a method according to claim 1.

12. A computer system comprising:

a storage device having stored therein a plurality of executable instructions; and an execution unit, coupled to the storage device, to execute at least a subset of the plurality of executable instructions to implement a method according to claim 1.

13. A storage medium comprising a plurality of executable instructions including at least a subset of which, when executed, implement the method according to claim 1, wherein developing the initial language model:

generates a prefix tree data structure from items dissected from the received corpus;

identifies sub-strings of N items or less from the prefix tree; and populates the lexicon with the identified sub-strings.

* * * * *